United States Patent
Stevens et al.

(10) Patent No.: US 6,481,298 B1
(45) Date of Patent: Nov. 19, 2002

(54) VEHICLE BRAKE TESTING SYSTEM

(75) Inventors: Samuel S. Stevens, Harriman, TN (US); Jeffrey W. Hodgson, Lenoir City, TN (US)

(73) Assignees: The University of Tennessee Research Corporation, Knoxville, TN (US); UT-Battelle, LLC, Oak Ridge, TN (US)

( * ) Notice: Subject to any disclaimer, the term of this patent is extended or adjusted under 35 U.S.C. 154(b) by 39 days.

(21) Appl. No.: 09/711,653

(22) Filed: Nov. 13, 2000

(51) Int. Cl.[7] .............................. G01L 5/28
(52) U.S. Cl. ............ 73/862.381; 73/121; 73/862.042; 73/862.043; 73/862.046
(58) Field of Search .................. 73/121, 122, 128, 73/862.041, 862.042, 862.044, 862.045, 862.046, 862.381, 862.043

(56) References Cited

U.S. PATENT DOCUMENTS

| | | | |
|---|---|---|---|
| 1,831,198 A | * 11/1931 | Sandberg et al. | 73/122 |
| 3,667,560 A | 6/1972 | Cooke | |
| 3,805,604 A | 4/1974 | Ormond | |
| 3,891,041 A | 6/1975 | Hall et al. | |
| 3,967,691 A | 7/1976 | Wirth | |
| 4,011,751 A | * 3/1977 | Weiss et al. | 73/122 |
| 5,083,456 A | 1/1992 | Colarelli, III | |
| 5,129,260 A | 7/1992 | van der Avoird | |
| 5,230,242 A | 7/1993 | Colareli, III | |
| 5,259,253 A | 11/1993 | Wirth et al. | |
| 5,305,636 A | 4/1994 | Balsarotti et al. | |
| 5,359,902 A | 11/1994 | Barger et al. | |
| 5,979,230 A | 11/1999 | Balsarotti | |
| 6,079,258 A | 6/2000 | List et al. | |
| 6,105,438 A | 8/2000 | Gieseke | |
| 6,112,600 A | * 9/2000 | Sonderegger | 177/136 |
| 6,354,157 B1 | * 3/2002 | Hodgson | 73/862.381 |

* cited by examiner

Primary Examiner—Eric S. McCall
(74) Attorney, Agent, or Firm—Duane Morris LLP

(57) ABSTRACT

This invention relates to a force measuring system capable of measuring forces associated with vehicle braking and of evaluating braking performance. The disclosure concerns an invention which comprises a first row of linearly aligned plates, a force bearing surface extending beneath and beside the plates, vertically oriented links and horizontally oriented links connecting each plate to a force bearing surface, a force measuring device in each link, a transducer coupled to each force measuring device, and a computing device coupled to receive an output signal from the transducer indicative of measured force in each force measuring device. The present invention may be used for testing vehicle brake systems.

22 Claims, 6 Drawing Sheets

VEHICLE BRAKE TESTING SYSTEM

The United States Government has rights in this invention pursuant to contract DE-AC05-00OR22725 between the United States Department of Energy and UT-Battelle, LLC.

BACKGROUND OF THE INVENTION

1. Field of the Invention

This invention relates to a force measuring system capable of measuring forces associated with vehicle braking and of evaluating braking performance. The disclosure concerns an invention which comprises a first row of linearly aligned plates, a force bearing surface extending beneath and beside the plates, vertically oriented links and horizontally oriented links connecting each plate to a force bearing surface, a force measuring device in each link, a transducer coupled to each force measuring device, and a computing device coupled to receive an output signal from the transducer indicative of measured force in each force measuring device. The present invention may be used for testing vehicle brake systems.

2. Description of the Prior Art

Prior art vehicle testing systems comprise two parallel rows of plates and load cells for measuring braking forces in dynamic weight associated with each plate, as shown U.S. Pat. No. 5,979,230. Other prior art vehicle testing systems comprise a first pair of substantially parallel plates and second pair of substantially parallel plates disposed behind and adjacent to the first pair of parallel plates in further comprising load cells connected to the plates, as disclosed in U.S. Pat. No. 5,305,636. Other prior art vehicle brake testing systems comprising pairs of plates and for sensing devices such as load cells, include U.S. Pat. Nos. 5,129,260 and 5,083,456.

DESCRIPTION OF THE PREFERRED EMBODIMENTS

Figure 4:
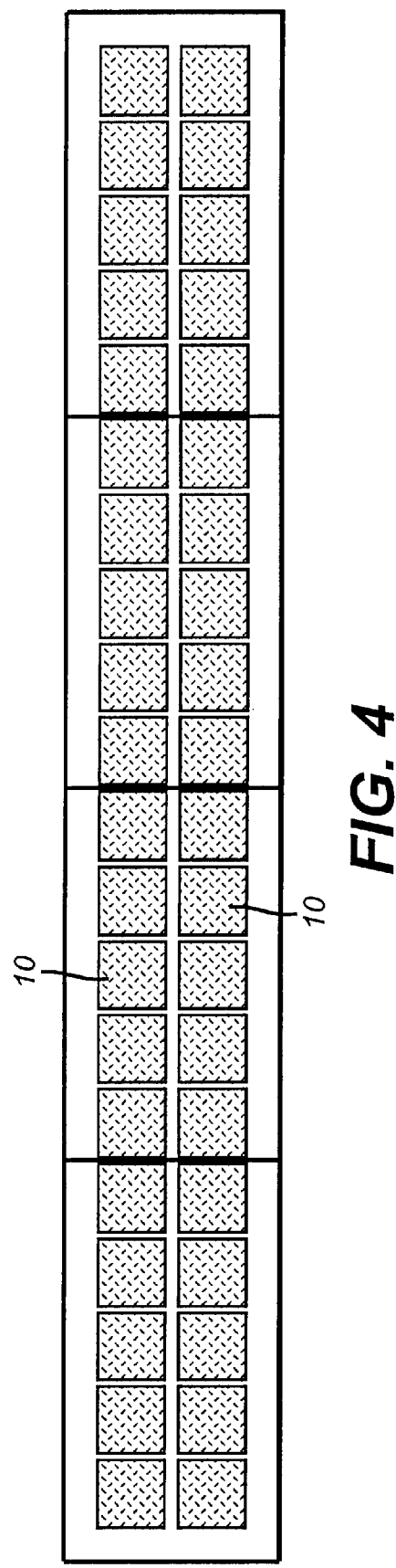
FIG. 4 is an top view of the two row embodiment of the present invention.

A first embodiment of the vehicle brake testing system of the present invention comprises a first row of plates comprising at least 10 linearly aligned plates 10, as shown in FIG. 4. Each plate has a surface area of at least 1 square foot and the spacing between the plates is less than 1 inch, but is sufficient for each plate to be deflected as a result of the vehicle passing over it, without touching an adjacent plate. The first row of plates has the length of at least 10 feet.

Figure 1:
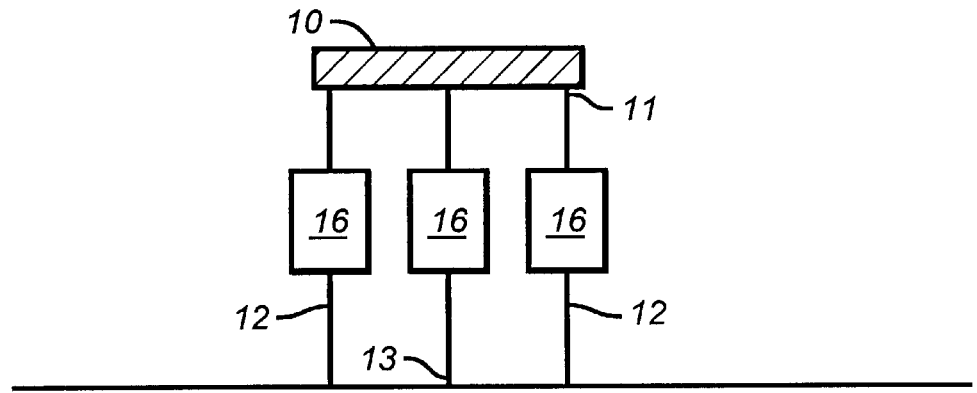
FIG. 1 is a side view of a single plate and the first row of plates of the present invention, connected to a force bearing surface by vertically oriented links.

The first embodiment of the present invention comprises at least 30 vertically oriented links 12. Each of the vertically oriented links comprises a top end 11 connected to one of the plates such that there are at least 3 vertically oriented links connected to each plate, as shown in FIG. 1. Each vertically oriented link further comprises a bottom end 13 attachable to a force bearing surface 14, as shown in FIG. 1.

This first embodiment of the present invention further comprises at least 40 horizontally oriented links 18. Each of the horizontally oriented links comprises a first end 15 connected to one of the plates such that there are at least a first and second pair of horizontally oriented links connected to each plate. The first pair of horizontally oriented links is positioned substantially perpendicular to the second pair of horizontally oriented links for each plate, as shown in FIG. 3

Figure 2:
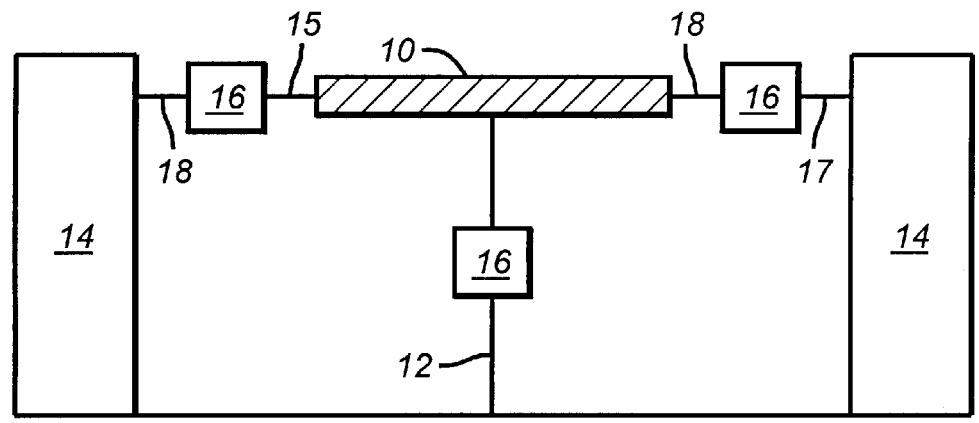
FIG. 2 is a front view of an embodiment of the present invention.

In other preferred embodiments, the first pair of horizontal links is referred to as transverse links and the second pair of horizontally oriented links is referred to as longitudinal links. Each horizontally oriented link further comprises a second end 17 attachable to a force bearing surface 14, as shown in FIGS. 2 and 3.

Figure 3:
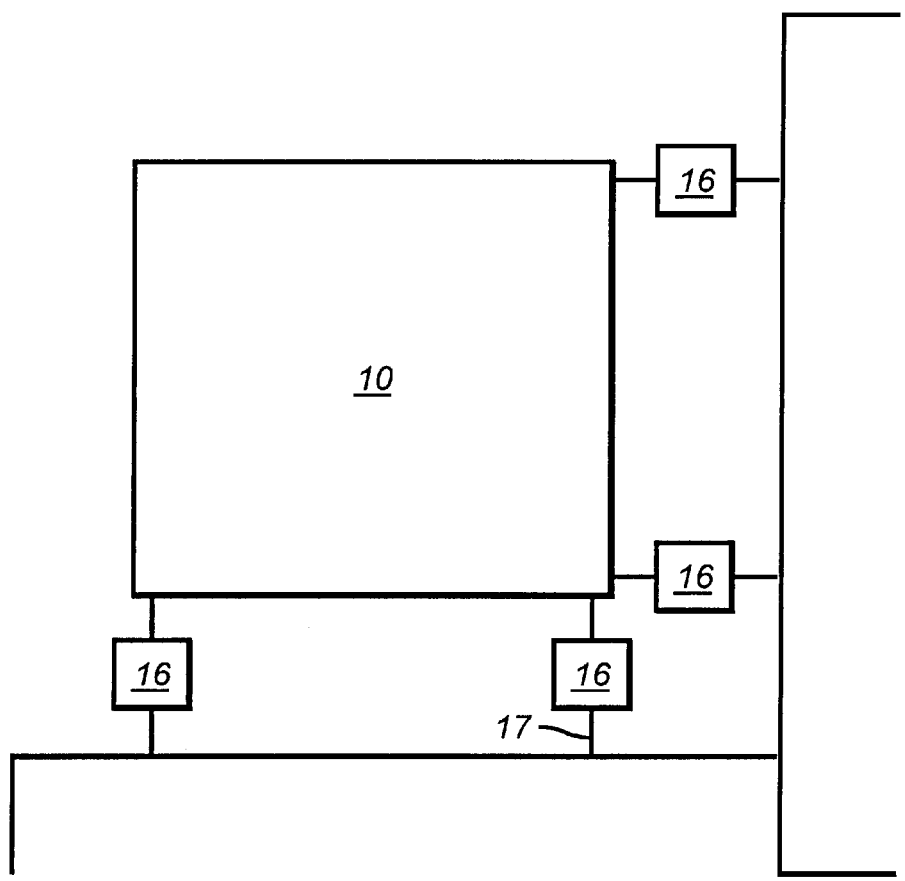
FIG. 3 is a top view of a single plate at the end of a row in an embodiment of the present invention.
Figure 9:
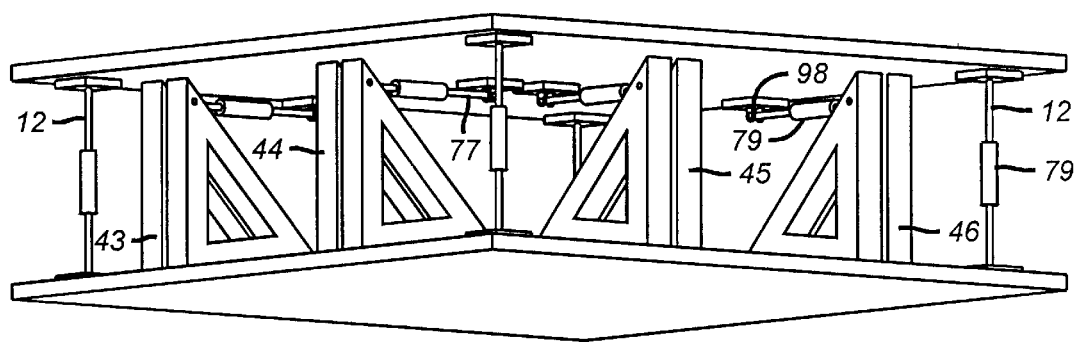
FIG. 9 is a side view of one pair of upper and lower plates in the four bar linkage embodiment of the present invention.

For plates located at the end of the row, a force bearing surface, in the form of a vertical wall may face two perpendicular sides of the plate, as depicted in FIG. 3. In this embodiment, each pair of horizontal links is attached to a different force bearing surface. In other embodiments, triangular brackets may be attached to a force bearing surface below each plate and the horizontally oriented links may be attached to such brackets, as shown in FIG. 9. Such an embodiment is particularly suited for plates in each row other than the first and last plate in the row.

Figure 5:
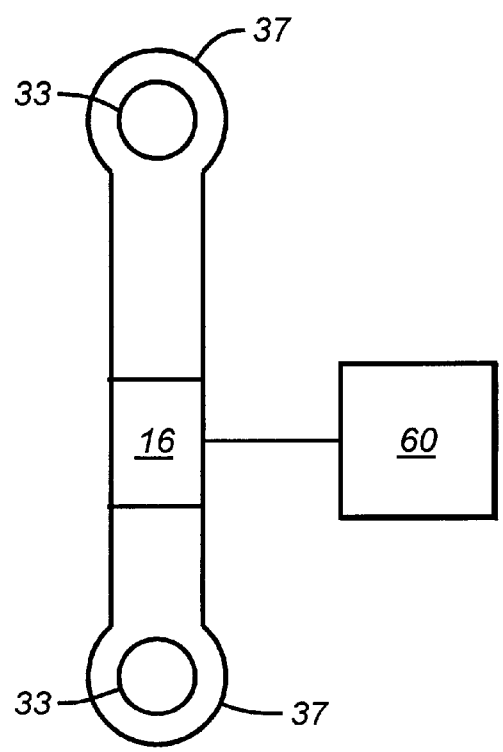
FIG. 5 is a side view of an embodiment of a link and transducer of the present invention.

In a preferred embodiment, the ends of each link of the present invention comprise spherical bearings 33 mounted in spherical rod ends 37, as shown in FIG. 5. The use of spherical bearings allows freedom of movement in response to forces applied along different axes.

In a preferred embodiment, the first row of plates comprises at least 20 plates and is at least 20 feet long. In this embodiment, the system comprises at least 60 vertically oriented links and at least 80 horizontally oriented links.

Figure 6:
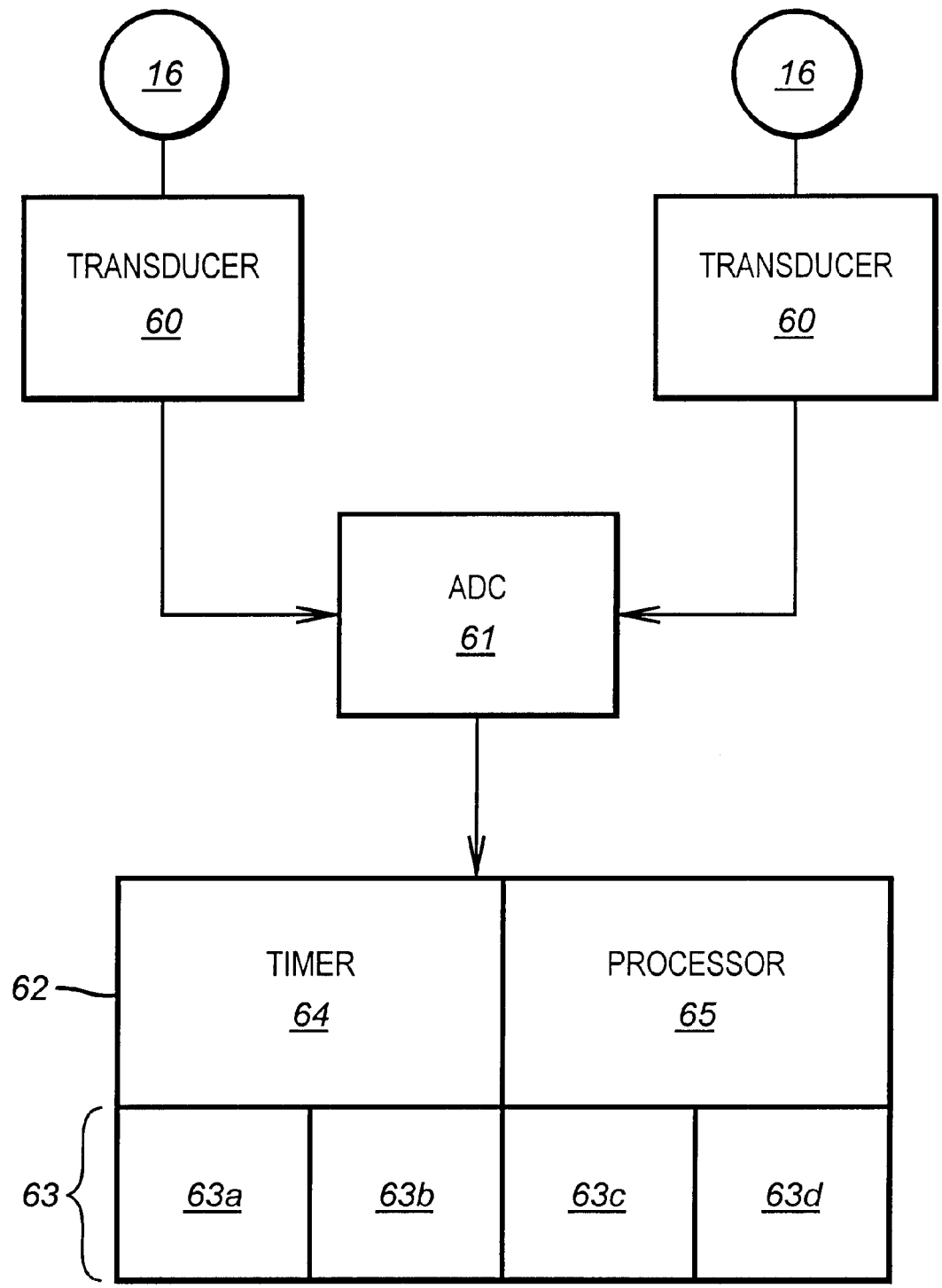
FIG. 6 is a block diagram of the force measuring and signal processing circuitry of the present invention.

This first embodiment of the present invention further comprises a force measuring device 16 mounted in each vertically oriented link and in each horizontally oriented link, as shown in FIGS. 2 and 3. In a preferred embodiment, the force measuring device is a strain gauge. This first embodiment of the present invention further comprises a transducer 60 coupled to receive a force measurement from each force measuring device, as shown in FIG. 6. The transducer is capable of converting force measurement to an output signal indicative of measured force. The output signal may be either digital or analog. In one preferred embodiment, the transducer transmits an output signal to analog data acquisition channels of the computer-based data acquisition system.

In a preferred embodiment, each transducer comprises an analog to digital converter 61 and each output signal is a digital signal. The present invention is capable of measuring significant motion of a moving vehicle. During a vehicle maneuver, force or strain data is collected from each link. In a preferred embodiment, this data is collected at a sampling rate that is more than twice as high as the highest expected frequency of the vehicle motion of interest. In another preferred embodiment, the sampling frequency is at least 100 hertz.

The invention further comprises a computing device 62, coupled to receive an output signal from the transducer, indicative of measured force in each force measuring device, as shown in FIG. 6. The computing device is further capable of calculating a vehicle performance parameter. In a preferred embodiment each computing device is a digital processor.

In a preferred embodiment, the computing device comprises a memory 63 comprising a multiplicity of bins 63a–63d. the memory is capable of receiving output signals and of sorting and storing data in each bin according to the position and location of the link from where the data originated. In this embodiment, the computing device also comprises a timer 64 capable of measuring the time at which each output signal is received. In this embodiment, the invention further comprises a processor 65 capable of selectively retrieving data from the memory and of calculating brake performance parameters, as shown in FIG. 6.

The vehicle parameters of interest include, but are not limited to, brake effectiveness, brake timing, tire traction, and effective positive acceleration. For example, braking effectiveness is a ratio of negative longitudinal acceleration force to weight for the wheel under consideration. In a braking maneuver, each plate will experience vertical force due to the weight supported by the wheel and horizontal force due to the braking of the wheel as the wheel passes over the plate. The succession of plates in the row of plates of the present invention can provide a succession of braking effectiveness measurements for the duration of the vehicle maneuver. The succession of measurements can be analyzed for total braking capability of the vehicle, peak braking effectiveness, average effectiveness, or various other operational measurements. The functionality of anti-lock braking systems ("ABS") may also be measured by the present invention. Such measurements may be made by evaluating time versus braking force for each wheel under consideration. The functionality of electronically controlled brakes may also be evaluated by comparing brake forces as a function of time for various wheels of the vehicle under consideration. Additionally, axle load may be derived from data indicating the sum of left and right weights per axle for the vehicle under consideration.

A second embodiment of the invention comprises a second row of plates connected to a force bearing surface by vertically and horizontally oriented axes, as described above for the first row of plates. This "two row" embodiment is shown in FIG. 4. The second row of plates is located substantially parallel to the first row of plates, with the first plate in the first and second row of plates placed opposite each other, as shown in FIG. 4. The spacing between the first and second row of plates is a function of the spacing of the right and left tires of the vehicle to be tested.

In a preferred embodiment, the first and second row of plates should be spaced equivalent to the spacing of the right and left tires of the vehicle to be tested. In a preferred embodiment, the first and second row of plates may comprise at least 20 plates with at least three vertically oriented links per plate and at least four horizontally oriented links per plate. This embodiment is particularly well suited to testing the brakes of a multiaxle vehicle and for evaluating side-to-side variation in braking forces.

Figure 7:
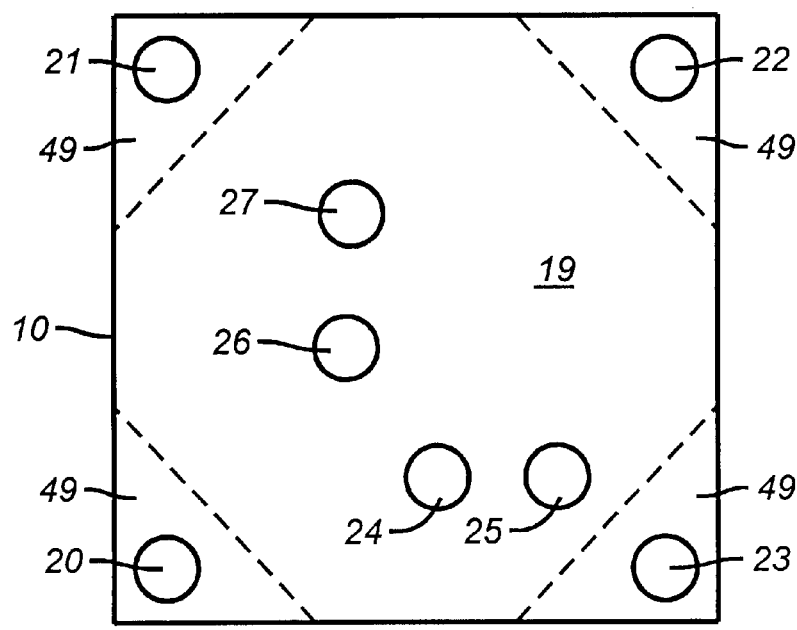
FIG. 7 is a bottom view of the bottom surface of an upper plate in the four bar linkage embodiment of the present invention.
Figure 10:
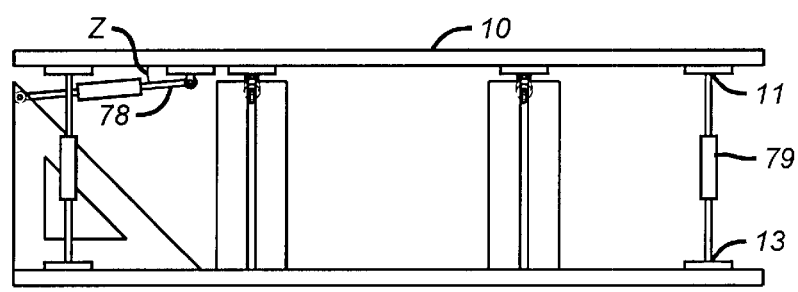
FIG. 10 is an isometric view of one pair of upper and lower plates in the four bar linkage embodiment of the present invention.

Another embodiment of the present invention is directed toward a first row of upper plates and a first row of lower plates connected by a four bar linkage, as shown in FIGS. 9–10. The first row of upper plates comprising at least 10 linearly aligned plates 10. Each upper plate has a surface area of at least one square foot. The spacing between the upper plates is less than one inch but sufficient for each upper plate to be deflected as a result of a vehicle passing over it, without touching an adjacent plate. The first row of upper plates has a length of at least 10 feet. Each upper plate comprises a bottom surface 19, and four corner regions 49, as shown in FIG. 7.

This four bar linkage embodiment further comprises a first row of lower plates, comprising a lower plate 40 positioned underneath and in substantial vertical alignment with each of upper plate to form a pair of aligned upper and lower plates, as shown in FIGS. 9–10. Each lower plate comprises four corner regions 51 in substantial vertical alignment with the four corner regions of the upper plate under which it is positioned, as shown in FIG. 9.

Figure 8:
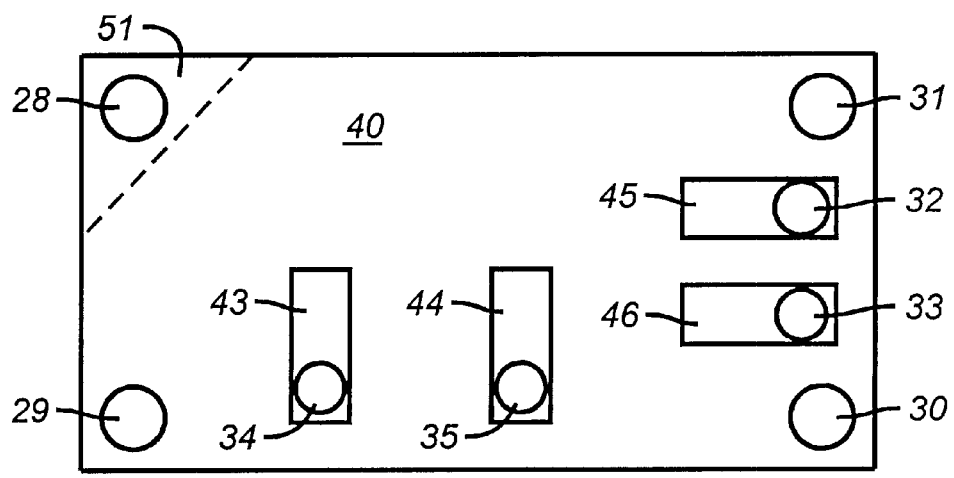
FIG. 8 is a top view of the bottom surface of a lower plate in the four bar linkage embodiment of the present invention.

This four bar linkage embodiment further comprises four support brackets 43–46 mounted on each lower plate and extending upward without touching an upper plate, as shown in FIGS. 9–10. Each bracket has an upper region extending in close proximity to the bottom surface of one of the upper plates, as shown in FIG. 8. The first and second brackets are positioned in substantially perpendicular relation to the third and fourth brackets, as shown in FIG. 9.

In a preferred embodiment, each lower plate has a first side region and a second side region perpendicular to the first side region, as shown in FIG. 8. In this embodiment, the first and second brackets are mounted to the first side region and the third and fourth brackets are mounted to second side region, as shown in FIGS. 9–10.

This four bar linkage embodiment further comprises sixteen spherical rod ends positioned between each pair of upper and lower plates. Four of these spherical rod ends 20–23 are attached to a corner region of each of the upper plates, and four of the spherical rod ends 28–31 are attached to a corner region of each of the lower plates in substantial vertical alignment with a spherical rod end attached to a corner region of one of said upper plates. Four of the spherical rod ends 32–35 are attached to an upper region each of the brackets, and four of said spherical rod ends 24–27 are attached to the bottom surface of each of the upper plates outside any corner regions of the upper plate, as shown in FIGS. 7–8.

This four bar linkage embodiment further comprises four vertically oriented links 12 extending between each pair of upper and lower plates, as shown in FIGS. 9–10. Each of the vertically oriented links comprises a first end 11 attached to one of the spherical rod ends attached to a corner region of one of the upper plates. Each vertically oriented link further comprises a second end 13 attached to one of the spherical rod ends attached to one of said lower plates, as shown in FIGS. 9–10.

This four bar linkage embodiment further comprises two transverse links 78 extending between each pair of plates, as shown in FIG. 9. Each of the transverse links comprises a first end attached to a spherical rod end attached to the bottom surface of one of the upper plates outside a corner region of the upper plate. In a preferred embodiment, the first end of each transverse link is attached to a mounting bracket 98 extending downward from the bottom surface of the upper plate, such that the transverse link is oriented along a horizontal axis, as shown in FIG. 9.

Each transverse links further comprises a second end attached to a spherical rod end attached to an upper region of a bracket, such that each pair of transverse links extend between the bottom surface of one of the upper plates and the upper regions of two of said mounting brackets in a substantially parallel arrangement to each other, as shown in FIG. 9.

In another embodiment, each transverse link is oriented at a slight acute angle Z to the top plate, as shown in FIG. 10. Force measurements taken in such links must be trigonometrically adjusted to account for the angle Z. Such an adjustment can be made by multiplying the measured force by the cosine of the angle Z.

This four bar linkage embodiment further comprises two longitudinal links 77 extending between each pair of plates, as shown in FIG. 9. Each longitudinal link comprises a first end attached to a spherical rod end attached to the bottom surface of one of the upper plates outside a corner region of the upper plate. Each longitudinal links further comprises a second end attached to a spherical rod end attached to an upper region of said bracket, such that each pair of longitudinal links extend between the bottom surface of said one of said upper plates and the upper regions of two of said brackets in a substantially parallel arrangement to each other and in a substantially perpendicular arrangement to said transverse links, as shown in FIG. 9.

This four bar linkage embodiment further comprises a force measuring device 79 located in each vertically oriented link, as shown in FIG. 9. In a preferred embodiment, the invention further comprises a force measuring device mounted in each transverse link. In another preferred embodiment, the invention further comprises a force measuring device mounted in each longitudinal link.

This four bar linkage embodiment further comprises a transducer coupled to receive a force measurement from each force measuring device. Each transducer is capable of converting a force measurement to an output signal indicative of measured force. This embodiment further comprises a computing device coupled to receive an output signal from said transducer indicative of measured force in each force measuring device and of calculating a vehicle performance parameter.

Data can be sorted by link position and direction of force, including vertical forces, transverse horizontal forces, and longitudinal horizontal forces. This sorting can be accomplished by using a computing device with memory storage areas or bins available to accept and process data from a specific classification of links, such as the vertically oriented links, transverse links, or longitudinal links of the four bar embodiment of the present invention.

In addition to the data sorting referred to above, data can be additionally sorted by plate location and time for each force dimension. Such processing is useful to separate data into sequential forces caused by each wheel of the vehicle whose performance is being evaluated.

The foregoing disclosure and description of the invention are illustrative and explanatory. Various changes in the size, shape, and materials, as well as in the details of the illustrative embodiments may be made without departing from the spirit of the invention.

What is claimed is:

1. A vehicle force measuring system comprising:
   a. a first row of plates, said row comprising at least 10 linearly aligned plates, each of said plates having a surface area of at least one square foot and the spacing between said plates being less than one inch but sufficient for each plate to be deflected as a result of a vehicle passing over each plate, without touching an adjacent plate, said first row having a length of at least 10 feet;
   b. at least 30 vertically oriented links, each of said links comprising a top end connected to one of said plates such that there are at least three vertically oriented links connected to each plate and each of said links further comprising a bottom end attachable to a force bearing surface;
   c. at least two brackets mounted below each plate;
   d. at least 40 horizontally oriented links, each of said horizontally oriented links comprising a first end connected to one of said plates such that there are at least a first and second pair of horizontally oriented links connected to each plate, said first pair of horizontally oriented links being positioned substantially perpendicular to said second pair of horizontally oriented links for each plate, and each of said horizontally oriented links further comprises a second end attachable to a force bearing surface;
   e. a force measuring device mounted in each vertically oriented link and in each horizontally oriented link;
   f. a transducer coupled to receive a force measurement from each force measuring device, said transducer capable of converting said force measurement to an output signal indicative of measured force; and
   g. a computing device coupled to receive an output signal from said transducer indicative of measured force in each force measuring device.

2. The system of claim 1, wherein each computing device comprises:
   a. a memory comprising a multiplicity of bins, said memory being capable of receiving said output signals, and of sorting and storing data in each of said bins according to the position and location of the ink from where the data originated;
   b. a timer capable of measuring the time at which each output signal is received; and
   c. a processor capable of selectively retrieving data from said memory and of calculating brake performance parameters.

3. The system of claim 1, wherein each transducer comprises an analog to digital converter and each output signal is a digital signal.

4. The system of claim 3, wherein each computing device is a digital processor.

5. The system of claim 1, wherein each second end of one pair of horizontally oriented links per plate is attached to a bracket.

6. The system of claim 1, wherein said first row of plates comprises at least 20 plates and is at least 20 feet long and further comprising at least 60 vertically oriented links and at least 80 horizontally oriented links.

7. The system of claim 1, wherein each force measuring device is a strain gauge.

8. A vehicle force measuring system, comprising:
   a. a first row of plates, said row comprising at least 10 linearly aligned plates, each of said plates having a surface area of at least one square foot and the spacing between said plates being less than one inch but sufficient for each plate to be deflected as a result of a vehicle passing over each plate, without touching an adjacent plate, said first row having a length of at least 10 feet;

b. a second row of plates, said row comprising at least 10 linearly aligned plates, each of said plates having a surface area of at least one square foot and the spacing between said plates being less than one inch but sufficient for each plate to be deflected as a result of a vehicle passing over each plate, without touching an adjacent plate, said second row having a length of at least 10 feet, said second row of plates being positioned substantially parallel to said first row of plates;

c. at least two brackets mounted below each plate;

d. at least 60 vertically oriented links, each of said links comprising atop end connected to one of said plates such that there are at least three vertically oriented links connected to each plate and each of said links further comprising a bottom end attachable to a force bearing surface;

e. at least 80 horizontally oriented links, each of said horizontally oriented links comprising a first end connected to one of said plates such that there are at least a first and second pair of horizontally oriented links connected to each plate, said first pair of horizontally oriented links being positioned substantially perpendicular to said second pair of horizontally oriented links for each plate, and each of said horizontally oriented links further comprises a second end attachable to a force bearing surface;

f. a force measuring device mounted in each vertically oriented link and in each horizontally oriented link;

g. a transducer coupled to receive a force measurement from each force measuring device, said transducer capable of converting said force measurement to an output signal indicative of measured force; and h. a computing device coupled to receive an output signal from said transducer indicative of measured force in each force measuring device.

9. The system of claim 8, wherein each transducer comprises an analog to digital converter and each output signal is a digital signal.

10. The system of claim 8, wherein each computing device is a digital processor.

11. The system of claim 8, wherein said first row of plates and said second row of plates each comprise at least 20 plates and is at least 20 feet long and further comprising at least 120 vertically oriented links and at least 160 horizontally oriented links.

12. The system of claim 8, wherein each force measuring device is a strain gauge.

13. A system for measuring loads applied to a platform comprising:

a. a first row of upper plates, said row comprising at least 10 linearly aligned plates, each of said plates having a surface area of at least one square foot and the spacing between said plates being less than one inch but sufficient for each plate to be deflected as a result of a vehicle passing over each plate, without touching an adjacent plate, said first row having a length of at least 10 feet, each of said plates comprising a bottom surface, and four corner regions;

b. a first row of lower plates, comprising a lower plate positioned underneath and in substantial vertical alignment with each of said upper plates to form a pair of aligned upper and lower plates, each of said lower plates comprising four corner regions in substantial vertical alignment with the four corner regions of the upper plate under which each lower plate is positioned;

c. four support brackets mounted on each of said lower plates and extending upward without touching an upper plate, each of said brackets having an upper region extending in close proximity to the bottom surface of one of said upper plates, the first and second brackets being positioned in substantially perpendicular relation to the third and fourth brackets;

d. sixteen spherical rod ends positioned between each pair of upper and lower plates, four of said spherical rod ends attached to a corner region of each of said upper plates, and four of said spherical rod ends attached to a corner region of each of said lower plates in substantial vertical alignment with a spherical rod end attached to a corner region of one of said upper plates, four of said spherical rod ends attached to an upper region each of said brackets, and four of said spherical rod ends attached to the bottom surface of each of said upper plates outside any corner regions of said upper plate;

e. four vertically oriented links extending between each pair of upper and lower plates, each of said vertically oriented links comprising a first end attached to one of said spherical rod ends attached to a corner region of one of said upper plates, and further comprising a second end attached to one of said spherical rod ends attached to one of said lower plates;

f. two transverse links extending between each pair of plates, each of said transverse links having a first end attached to a spherical rod end attached to the bottom surface of one of said upper plates outside a corner region of said upper plate and each of said transverse links further having a second end attached to a spherical rod end attached to an upper region of said bracket, such that said transverse links extend between the bottom surface of one of said upper plates and the upper regions of two of said mounting brackets in a substantially parallel arrangement to each other;

g. two longitudinal links extending between each pair of plates, each of said longitudinal links having a first end attached to a spherical rod end attached to the bottom surface of one of said upper plates outside a corner region of said upper plate and each of said longitudinal links further having a second end attached to a spherical rod end attached to an upper region of said bracket, such that said longitudinal links extend between the bottom surface of said one of said upper plates and the upper regions of two of said brackets in a substantially parallel arrangement to each other and in a substantially perpendicular arrangement to said transverse links;

h. a force measuring device, mounted in each of said vertically oriented links; and i. a transducer coupled to receive a force measurement from each force measuring device, said transducer capable of converting said force measurement to an output signal indicative of measured force; and j. a computing device coupled to receive an output signal from said transducer indicative of measured force in each force measuring device.

14. The system of claim 13, further comprising a force measuring device mounted in each of said transverse links.

15. The system of claim 14, further comprising a force measuring device mounted in each of said longitudinal links.

16. The system of claim 15, wherein each force measuring device is a strain guage.

17. The system of claim 13, wherein each of said lower plates has a first side region and a second side region perpendicular to said first side region.

18. The system of claim 15, wherein said first and second brackets are mounted to said first side region and said third and fourth brackets are mounted to second side region.

19. The system of claim 13, wherein each transducer comprises an analog to digital converter and each output signal is a digital signal.

20. The system of claim 13, wherein each output signal is an analog signal.

21. A vehicle measuring system comprising:
   a. A first row of plates, said row comprising at least 10 linearly aligned plates, each of said plates having a surface area of at least one square foot and the spacing between said plates being less than one inch but sufficient for each plate to be deflected as a result of a vehicle passing over each plate, without touching an adjacent plate, said first row having a length of at least 10 feet;
   b. at least 30 vertically oriented links, each of said links comprising a top end connected to one of said plates such that there are at least three vertically oriented links connected to each plate and each of said links further comprising a bottom end attachable to a force bearing surface;
   c. at least two brackets mounted below each plate;
   d. at least 20 horizontally oriented links, each of said horizontally oriented links comprising a first end connected to one of said plates such that there are at least a first and second horizontally oriented links connected to each plate, said first horizontally oriented link being positioned substantially perpendicular to said second horizontally oriented link for each plate, and each of said horizontally oriented links further comprises a second end attachable to a force bearing surface;
   e. a force measuring device mounted in each vertically oriented link and in each horizontally oriented link;
   f. a transducer coupled to receive a force measurement from each force measuring device, said transducer capable of converting said force measurement to an output signal indicative of measured force; and
   g. a computing device coupled to receive an output signal from said transducer indicative of measured force in each force measuring device.

22. The system of claim 21, wherein each second end of each horizontally oriented link is attached to a bracket.

* * * * *